United States Patent
Yang

(10) Patent No.: US 6,386,041 B1
(45) Date of Patent: May 14, 2002

(54) STEP COUNTING DEVICE INCORPORATING VIBRATION DETECTING MECHANISM

(76) Inventor: David Yang, 2F, No.7, Alley 2, Lane 87, Tien Mu North Road, Taipei 111 (TW)

(*) Notice: Subject to any disclaimer, the term of this patent is extended or adjusted under 35 U.S.C. 154(b) by 0 days.

(21) Appl. No.: 09/495,384

(22) Filed: Feb. 1, 2000

(51) Int. Cl.[7] .............................................. G01C 22/00
(52) U.S. Cl. ........................ 73/651; 73/432.1; 235/105; 36/136
(58) Field of Search .............................. 73/432.1, 570, 73/649, 651, 652, 488, 514.01; 36/132, 136; 235/105; 702/160

(56) References Cited

U.S. PATENT DOCUMENTS

| | | | |
|---|---|---|---|
| 3,797,010 A | * 3/1974 | Adler et al. | 340/323 R |
| 4,466,204 A | * 8/1984 | Wu | 36/132 |
| 4,771,394 A | * 9/1988 | Cavanagh | 702/160 |
| 5,485,402 A | * 1/1996 | Smith et al. | 702/160 |
| 5,891,042 A | * 4/1999 | Sham et al. | 600/483 |
| 6,132,391 A | * 10/2000 | Onari et al. | 600/595 |

FOREIGN PATENT DOCUMENTS

| | | | |
|---|---|---|---|
| JP | 7-239238 A | * | 9/1995 |
| JP | 11-149543 A | * | 6/1999 |

* cited by examiner

Primary Examiner—Hezron Williams
Assistant Examiner—Rose M. Miller
(74) Attorney, Agent, or Firm—Troxell Law Office PLLC

(57) ABSTRACT

A step counting device includes a top casing, a bottom casing, a display, and two operating buttons. A circuit board is arranged in the space between the top casing and the bottom casing. An open area is formed on the edge of the circuit board and a ceramic vibration detecting mechanism is arranged on the circuit board. One end of the ceramic vibration detecting mechanism is a fixed point located on a fixed position and the other end is a cantilever point extended to the open area of the circuit board and a heavy mass is attached to the cantilever point. The step counting device is attached on a shoe, and the step counting device will be vibrated while a user wears the shoes walking or running. The ceramic vibration detecting mechanism will receive the vibration and a tiny voltage change will be produced to become an input signal to the control circuit on the circuit board. Through counting, processing and exchanging the input signal by the control circuit, a step counting output signal will be outputted and a step number will be displayed on the display.

3 Claims, 6 Drawing Sheets

STEP COUNTING DEVICE INCORPORATING VIBRATION DETECTING MECHANISM

BACKGROUND OF THE INVENTION

1. Field of the Invention

The present invention generally relates to a step counting device and in particular to a step counting device incorporating vibration detecting mechanism which may be attached on shoes or clothes of a user arbitrarily and easily for counting steps.

2. Description of the Prior Art

Opportune exercise is important for keeping health, especially for those people who work busily all day. Exercising too much or not enough will both do harm to the health. Therefore, how to control and measure the quantity of exercise becomes a very important task. For those who are used to walking or running as their exercise, a step counting may be used to measure how many steps they have done. The step counting device may be integrated on shoes, when a user wears the shoes walking or running, the step numbers will be counted and displayed by the step counting device.

Conventionally, the step counting device may detecting the steps by some equipment such as circuit contacting point, pressing contact switch, or infrared ray detector. Some of the conventional step counting device must be integrated to shoes so that the step numbers detecting function may be executed. Some other conventional step counting devices will be easily damaged because of the influence of use condition. For example, the step counting device with infrared ray detector or pressing contact switch will not work easily because of the moisture and steam. Besides, some conventional step counting devices need to be integrated to shoes and connected to some extra electric wires or detecting mechanism, otherwise the step numbers detecting function can not work. It is really a trouble to arrange the extra equipment in the shoes.

It is thus desirable to have a step counting device having simple structure and may be used easily and durably for overcoming the problem discussed above.

SUMMARY OF THE INVENTION

Accordingly, an object of the present invention is to provide a step counting device incorporating a ceramic vibration detecting mechanism for counting steps.

Another object of the present invention is to provide a step counting device having compact structure without electric wires or detecting mechanism extra connected. When integrating the step counting device to the shoes, any space or passageway for the electric wires inside the shoes will not be needed. Without electric wires extra connected, the step counting device will not be easily damaged because of the influence of the use condition.

One more object of the present invention is to provide a step counting device that may be easily used. The step counting device may be easily attached or arranged on shoes for counting steps when a user is walking or running. Alternatively, the step counting device may be also attached on clothes or body for counting steps.

To achieve the above objects, in accordance with the present invention, there is provided a step counting device comprises a top casing, a bottom casing, a display, and two operating buttons. A circuit board is arranged between the top casing and the bottom casing. A control circuit and a battery for supplying power are arranged on the circuit board. An open area is formed on the edge and a ceramic vibration detecting mechanism is arranged on the circuit board. One end of the ceramic vibration detecting mechanism is a fixed point located on a fixed position and the other end is a cantilever point extended to the open area of the circuit board and a heavy mass is attached to the cantilever point. While the step counting device is vibrated, the vibration will be received by the ceramic vibration detecting mechanism and a tiny voltage change will be produced to become an input signal and be inputted to the control circuit on the circuit board. Through counting, processing and exchanging the input signal by the control circuit, a step counting output signal will be outputted and a step number will be displayed on the display.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENTS

Figure 1:
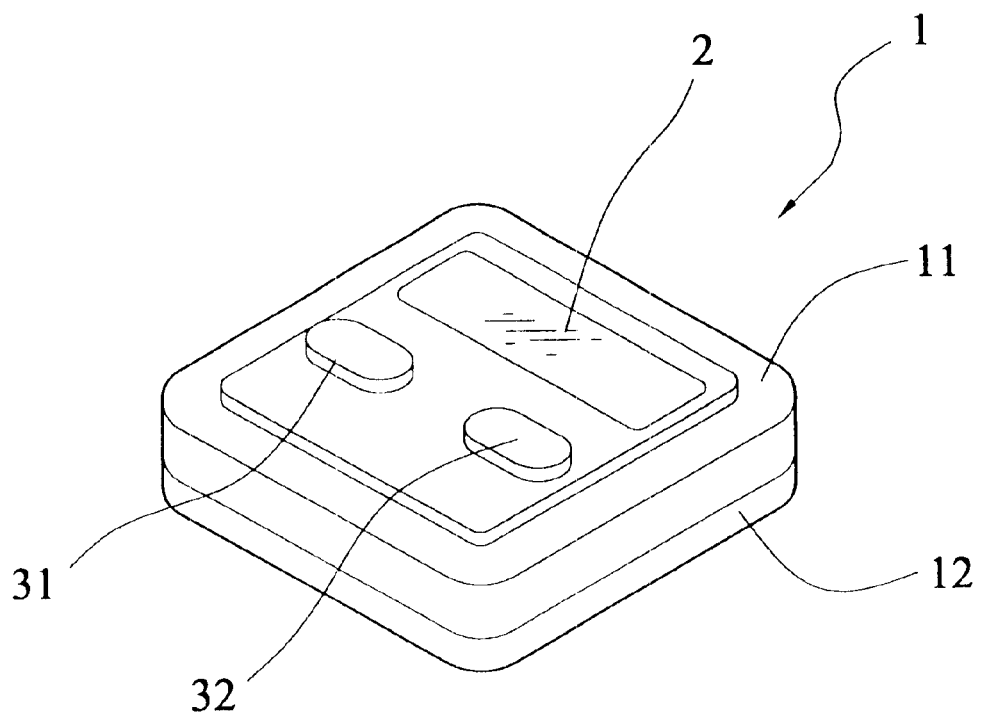
FIG. 1 is a perspective view of a step counting device of the present invention.
Figure 2:
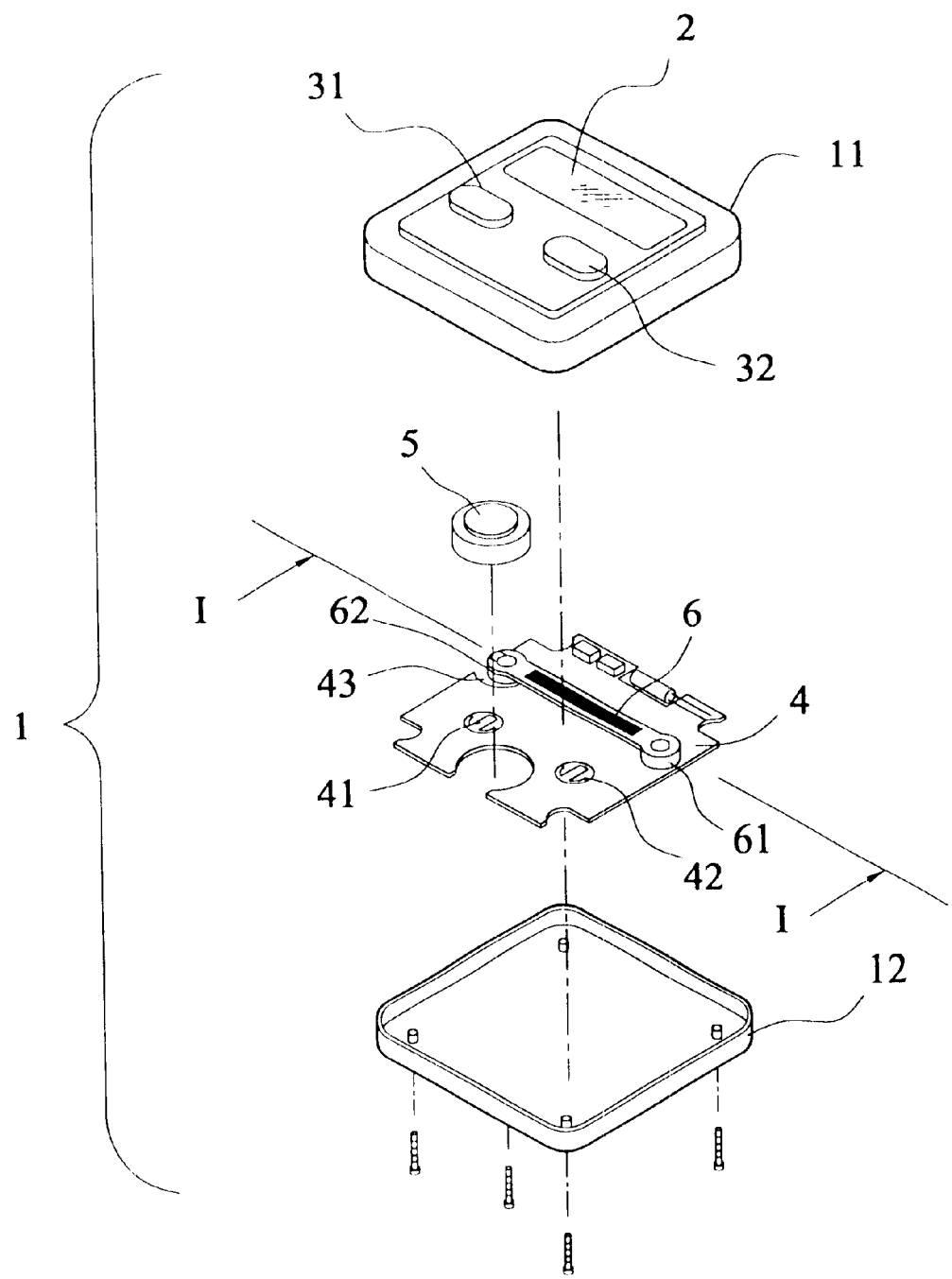
FIG. 2 is an exploded view of a step counting device of the present invention.

With reference to the drawings and in particularly to FIGS. 1 and 2, according to the embodiment of the present invention, the step counting device 1 comprises a top casing 11, a bottom casing 12, a display 2, and two buttons 31 and 32. The display 2 and the buttons 31 and 32 are formed on the top casing 11. The buttons 31 and 32 are used for operating and controlling, such as start or clear.

With accordance to FIG. 2, a circuit board 4 is arranged between the top casing 11 and the bottom casing 12. Two conductive contacts 41 and 42 are formed on the circuit board 4 corresponding to the two buttons 31 and 32 on the top casing 11. A number of circuit elements for controlling the step counting device 1 and a battery 5 for supplying power to the control circuit are arranged on the circuit board 4.

Figure 3:
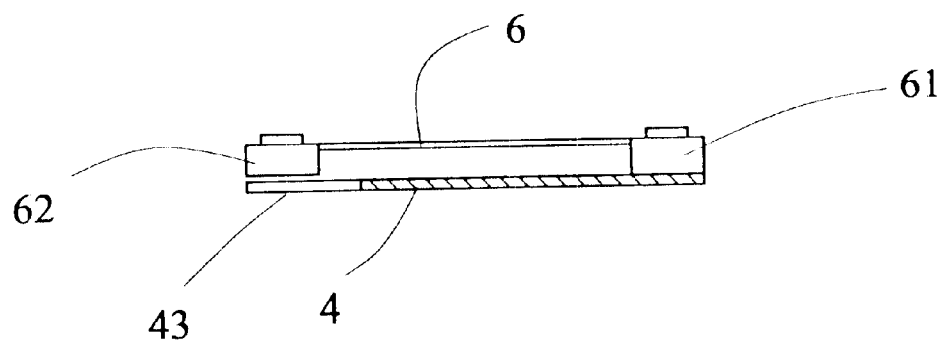
FIG. 3 is a sectional view of a step counting device of the present invention taken along line I—I of FIG. 2.

An open area 43 is formed on an edge of one side or other suitable position of the circuit board 4. A ceramic vibration detecting mechanism 6 is arranged on the circuit board 4. As shown in FIG. 3, the ceramic vibration detecting mechanism 6 comprises a ceramic flake with two ends in the central section. One end of the ceramic flake is a fixed point 61 located on a fixed position and the other end is a cantilever point extended to the open area 43 of the circuit board 4. There is a heavy mass 62 attached to the cantilever point.

Through a suitable weight of the heavy mass 62 and the winding stress of the cantilever point while being vibrated, the vibration will be received by the ceramic vibration detecting mechanism 6 and a tiny voltage change will be produced.

Figure 4:
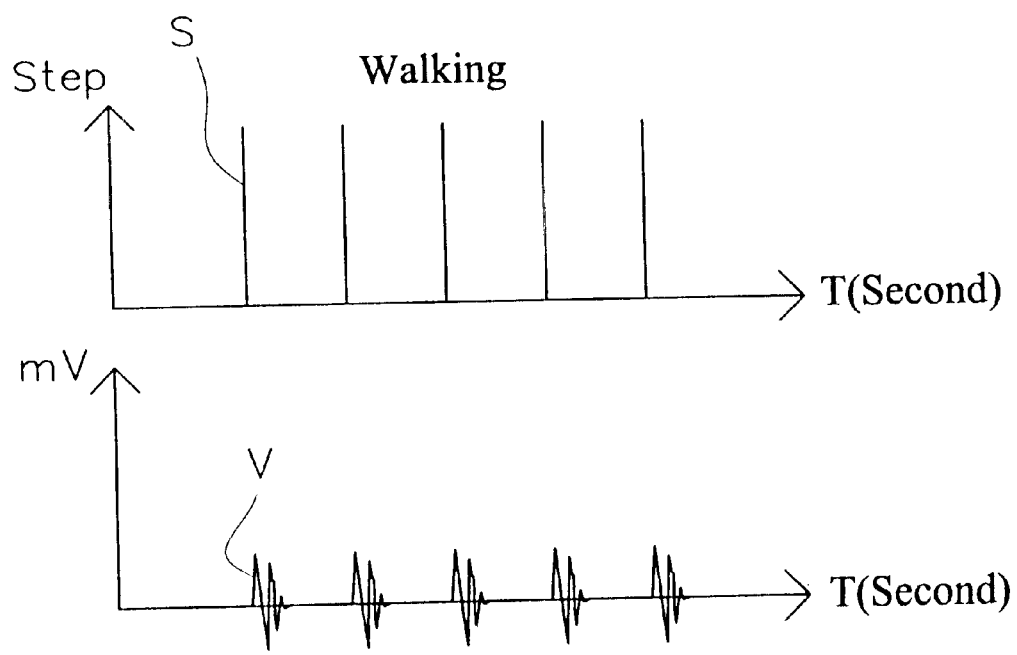
FIG. 4 is a schematic waveform diagram illustrating the relationship between step numbers and wave form of the output voltage from the ceramic vibration detecting mechanism.

With reference to FIG. 4, when a user run or walk a step S with wearing the step counting device of the present invention, the ceramic vibration detecting mechanism 6 will receive the tiny voltage change V (mV) at the instant from the vibration. The voltage change V will be sent to the circuit board 4, serving as a step counting input signal. After inputting the step counting input signal to the control circuit of the circuit board 4, through counting and exchanging the voltage signal, a step counting output signal will be outputted and a step number will be displayed on the display 2.

Figure 5:
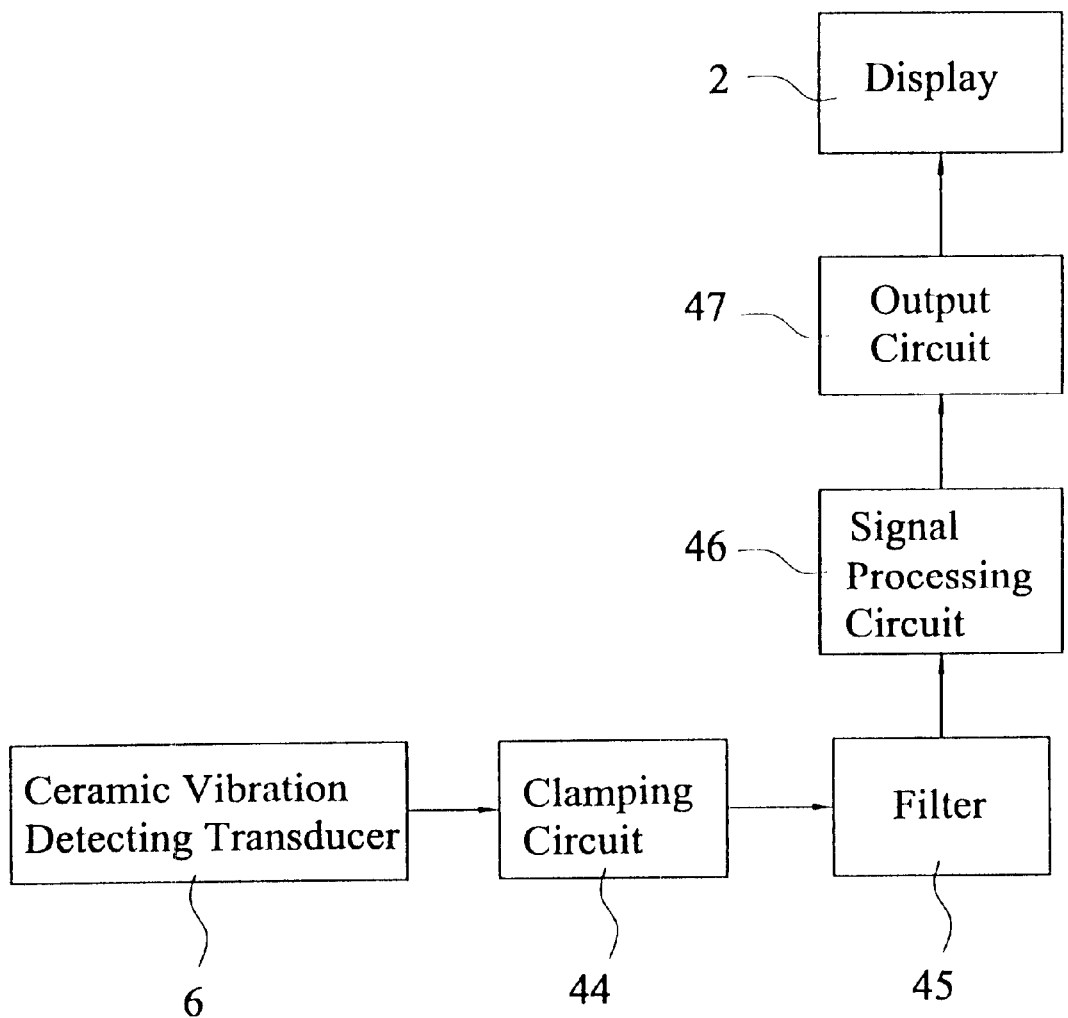
FIG. 5 is a functional circuit block diagram of the step counting device of the present invention.

According to FIG. 5, the control circuit comprises a clamping circuit 44, for receiving and clamping the output signals from the ceramic vibration detecting mechanism 6. The signals will be filtered through a signal filtering circuit 45 for filtering noise signals. The signals after wave filtering will be sent to a signal processing circuit 46 for exchanging, processing, and counting, and then be exchanged to the step counting output signal represented the step numbers of the user. The step counting output signal will be outputted through an output circuit 47 and a step number will be displayed on the display 2.

Figure 6:
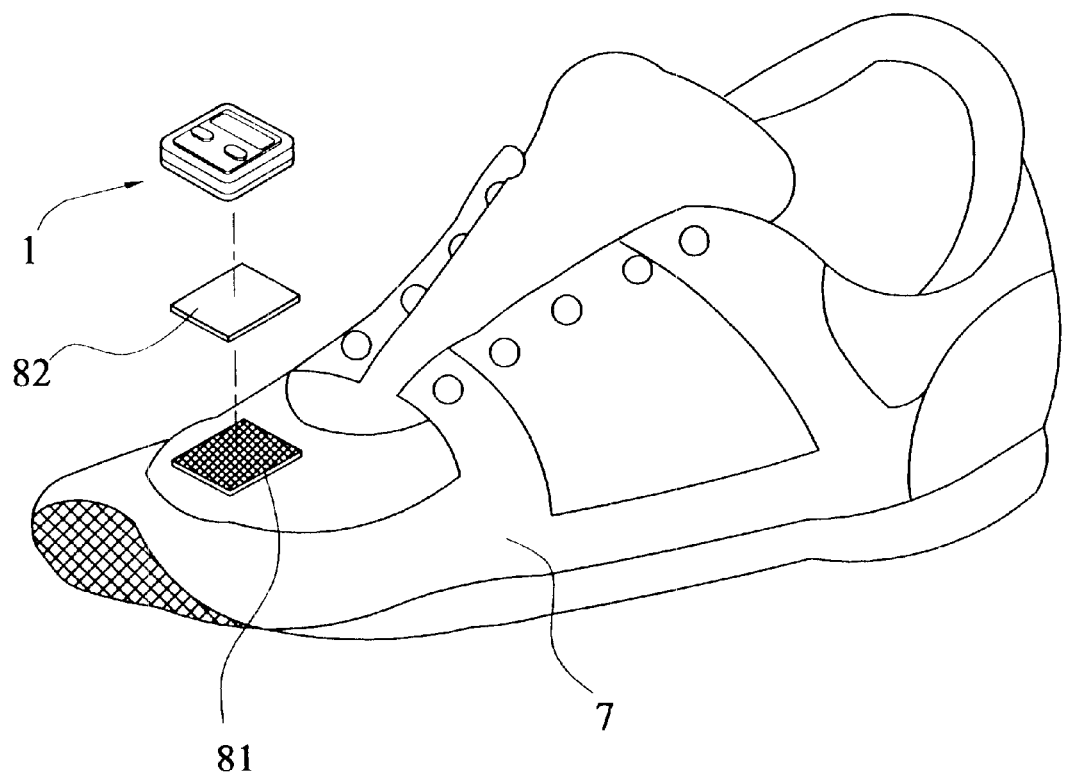
FIG. 6 is an embodiment showing a step counting device of the present invention being attached on a shoe by a hook and loop strip.

FIG. 6 is an embodiment showing the step counting device of the present invention being attached on a shoe partially covered with strips of hook and loop fastener materials. Similar materials for attaching the step counting device onto the shoe may be used. A hook or loop strip 81 is attached on a suitable place of the shoe 7, and a corresponding strip 82 is attached on the bottom of the step counting device 1, for holding the step counting device 1 on the shoe 7. When a user wears the shoe 7 walking or running, the step counting device 1 will detect and count the step numbers.

Figure 7:
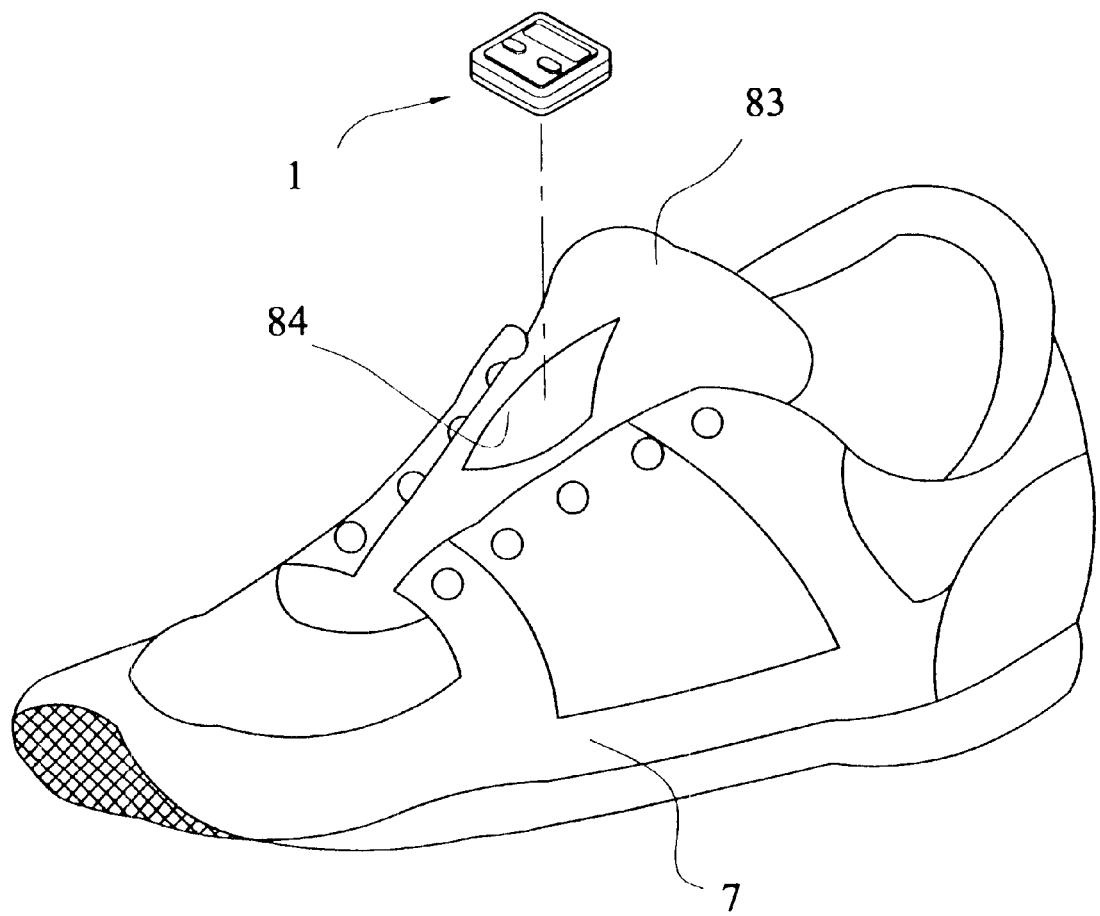
FIG. 7 is another embodiment showing a step counting device of the present invention being inserted in an opening of a shoe.

FIG. 7 shows the step counting device of the present invention being inserted into an opening of a shoe. An opening 84 is arranged on the shoe tongue 83 of the shoe 7 for forming a pouch inside the shoe tongue 83. The step counting device 1 may be held inside the pouch of the shoe tongue 83 through the opening 84. When a user wears the shoe 7 walking or running, the step counting device 1 will detect and count the step numbers.

Although the present invention has been described with respect to the preferred embodiments, it is contemplated that a variety of modifications, variations and substitutions may be done without departing from the scope of the present invention that is intended to be defined by the appended claims.

What is claimed is:

1. A self-contained step counting device attachable to a shoe and comprising:
    a) a circuit board including a filter circuit, a signal processing circuit connected to the filter circuit and an output circuit connected to the signal processing circuit, the circuit board having first and second opposite side edges, the first side edge having an open area, and a surface;
    b) a cantilevered, ceramic vibration detecting transducer having a first end fixedly mounted to the circuit board adjacent to the second edge such that the ceramic vibration detecting transducer is spaced from the surface of the circuit board, and a distal second end having a weight thereon aligned with the open area of the first edge thereby enabling movement of the second end relative to the circuit board;
    c) a casing including top and bottom casings completely enclosing the circuit board and the ceramic vibration detecting transducer such that the step counting device is self-contained; and,
    d) a visual display on the casing so as to be visible from exteriorly of the casing, the visual display connected to the output circuit.

2. The self-contained step counting device of claim 1, further comprising a fastener mounted on the casing to removably attach the step counting device to a shoe.

3. The self-contained step counting device of claim 2, wherein the fastener comprises a hook and loop fastener.

* * * * *